United States Patent
Daniel

(10) Patent No.: US 9,064,058 B2
(45) Date of Patent: Jun. 23, 2015

(54) VIRTUALIZED PCI ENDPOINT FOR EXTENDED SYSTEMS

(75) Inventor: David A. Daniel, Scottsdale, AZ (US)

(73) Assignee: NUON, INC., Scottsdale, AZ (US)

( * ) Notice: Subject to any disclaimer, the term of this patent is extended or adjusted under 35 U.S.C. 154(b) by 1113 days.

(21) Appl. No.: 12/653,785

(22) Filed: Dec. 18, 2009

(65) Prior Publication Data

US 2010/0161870 A1 Jun. 24, 2010

Related U.S. Application Data

(60) Provisional application No. 61/203,634, filed on Dec. 24, 2008.

(51) Int. Cl.
  G06F 13/00 (2006.01)
  G06F 13/38 (2006.01)
  H04L 29/06 (2006.01)

(52) U.S. Cl.
  CPC .............. G06F 13/385 (2013.01); H04L 69/16 (2013.01)

(58) Field of Classification Search
  CPC ....... H04L 69/16; H04L 69/169; H04L 69/08; G06F 13/00
  USPC .................. 710/313, 300, 306, 312, 314, 315
  See application file for complete search history.

(56) References Cited

U.S. PATENT DOCUMENTS

| | | | | |
|---|---|---|---|---|
| 5,996,024 A * | 11/1999 | Blumenau | ...................... | 719/326 |
| 6,662,254 B1 * | 12/2003 | Tal et al. | ........................ | 710/300 |
| 6,748,473 B1 * | 6/2004 | Shatas et al. | ................... | 710/300 |
| 7,512,663 B1 * | 3/2009 | Kodama et al. | ............... | 709/212 |
| 7,685,319 B2 * | 3/2010 | Gorodetsky et al. | ........... | 709/250 |
| 7,734,859 B2 * | 6/2010 | Daniel et al. | ................... | 710/315 |
| 7,783,783 B2 * | 8/2010 | Hetzler et al. | ................ | 709/250 |
| 7,917,681 B2 * | 3/2011 | Suzuki et al. | .................. | 710/312 |
| 8,117,372 B2 * | 2/2012 | Daniel et al. | ................... | 710/315 |
| 8,412,875 B2 * | 4/2013 | Suzuki et al. | .................. | 710/312 |
| 2002/0199047 A1 * | 12/2002 | DuPont et al. | ................ | 710/100 |
| 2004/0015991 A1 * | 1/2004 | Thornton | ......................... | 725/74 |
| 2006/0126612 A1 * | 6/2006 | Sandy et al. | ................... | 370/389 |
| 2006/0206655 A1 * | 9/2006 | Chappell et al. | ............... | 710/315 |
| 2010/0107182 A1 * | 4/2010 | Daniel | ........................... | 719/327 |
| 2010/0161870 A1 * | 6/2010 | Daniel | ........................... | 710/314 |
| 2010/0161872 A1 * | 6/2010 | Daniel | ........................... | 710/316 |

* cited by examiner

*Primary Examiner* — Glenn A Auve
(74) *Attorney, Agent, or Firm* — Robert C. Klinger

(57) ABSTRACT

Virtualization of a PCI Endpoint via the Internet and LANs. The invention is a solution that allows the use of low-complexity, low-cost PCI Express Endpoint Type 0 cores or custom logic for relatively simple virtualization applications. The invention combines two physically separate assemblies in such a way that they appear to the host system as one local multifunctional PCI Express Endpoint device.

20 Claims, 14 Drawing Sheets

FIG. 9

| TYPE 1 CONFIGURATION SPACE | | | | Double Word # |
|---|---|---|---|---|
| Byte | | | | |
| 3 | 2 | 1 | 0 | |
| Device ID | | Vendor ID | | 00 |
| Status Register | | Command Register | | 01 |
| Class Code | | | Revision ID | 02 |
| BIST | Header Type | Latency Timer | Cache Line Size | 03 |
| Base Address 0 | | | | 04 |
| Base Address 1 | | | | 05 |
| Secondary Latency Timer | Subordinate Bus Number | Secondary Bus Number | Primary Bus Number | 06 |
| Secondary Status | | I/O Limit | I/O Base | 07 |
| Memory Limit | | Memory Base | | 08 |
| Prefetchable Memory Limit | | Prefetchable Memory Base | | 09 |
| Prefetchable Base Upper 32 Bits | | | | 10 |
| Prefetchable Limit Upper 32 Bits | | | | 11 |
| I/O Limit Upper 16 Bits | | I/O Base Upper 16 Bits | | 12 |
| Reserved | | | Capability Pointer | 13 |
| Expansion ROM Base Address | | | | 14 |
| Bridge Control | | Interrupt Pin | Interrupt Line | 15 |

| TYPE 0 CONFIGURATION SPACE | | | | |
|---|---|---|---|---|
| Byte | | | | Double Word # |
| 3 | 2 | 1 | 0 | |
| Device ID | | Vendor ID | | 00 |
| Status Register | | Command Register | | 01 |
| Class Code | | | Revision ID | 02 |
| BIST | Header Type | Latency Timer | Cache Line Size | 03 |
| Base Address 0 | | | | 04 |
| Base Address 1 | | | | 05 |
| Base Address 2 | | | | 06 |
| Base Address 3 | | | | 07 |
| Base Address 4 | | | | 08 |
| Base Address 5 | | | | 09 |
| CardBus CIS Pointer | | | | 10 |
| Subsystem ID | | Subsystem Vendor ID | | 11 |
| Expansion ROM Base Address | | | | 12 |
| Reserved | | | Capabilities Pointer | 13 |
| Reserved | | | | 14 |
| Max_Lat | Max_Gnt | Interrupt Pin | Interrupt Line | 15 |

VIRTUALIZED PCI ENDPOINT FOR EXTENDED SYSTEMS

CLAIM OF PRIORITY

This application claims priority of U.S. Provisional Patent Application Ser. No. 61/203,634 entitled "VIRTUALIZATION OF REMOTE ENDPOINT FUNCTIONS WITHIN A LOCAL MULTIFUNCTION ENDPOINT DEVICE" filed Dec. 24, 2008, the teachings of which are incorporated herein by reference.

FIELD OF THE INVENTION

The present invention relates to PCI, PCI Express and virtualization of computer resources via high speed data networking protocols.

BACKGROUND OF THE INVENTION

Virtualization

There are two main categories of virtualization: 1) Computing Machine Virtualization 2) Resource Virtualization.

Computing machine virtualization involves definition and virtualization of multiple operating system (OS) instances and application stacks into partitions within a host system.

Resource virtualization refers to the abstraction of computer peripheral functions. There are two main types of Resource virtualization: 1) Storage Virtualization 2) System Memory-Mapped I/O Virtualization.

Storage virtualization involves the abstraction and aggregation of multiple physical storage components into logical storage pools that can then be allocated as needed to computing machines.

System Memory-Mapped I/O virtualization involves the abstraction of a wide variety of I/O resources, including but not limited to bridge devices, memory controllers, display controllers, input devices, multi-media devices, serial data acquisition devices, video devices, audio devices, modems, etc. that are assigned a location in host processor memory. Examples of System Memory-Mapped I/O Virtualization are exemplified by PCI Express I/O Virtualization (IOV) and applicant's technology referred to as i-PCI.

PCIe and PCIe I/O Virtualization

PCI Express (PCIe), as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific Input/Output (I/O) functions. A limitation of PCI Express is that it is limited to direct attach expansion.

The PCI Special Interest Group (PCI-SIG) has defined single root and multi-root I/O virtualization sharing specifications.

The single-root specification defines the means by which a host, executing multiple systems instances, may share PCI resources. In the case of single-root IOV, the resources are typically but not necessarily accessed via expansion slots located on the system motherboard itself and housed in the same enclosure as the host.

The multi-root specification on the other hand defines the means by which multiple hosts, executing multiple systems instances on disparate processing components, may utilize a common PCI Express (PCIe) switch in a topology to connect to and share common PCI Express resources. In the case of PCI Express multi-root IOV, resources are accessed and shared amongst two or more hosts via a PCI Express fabric. The resources are typically housed in a physically separate enclosure or card cage. Connections to the enclosure are via a high-performance short-distance cable as defined by the PCI Express External Cabling specification. The PCI Express resources may be serially or simultaneously shared.

A key constraint for PCIe I/O virtualization is the severe distance limitation of the external cabling. There is no provision for the utilization of networks for virtualization.

i-PCI

This invention builds and expands on the technology disclosed as "i-PCI" in commonly assigned copending U.S. patent application Ser. No. 12/148,712, the teachings of which are incorporated herein by reference. This patent application presents i-PCI as a new concept for extending computer systems over a network. The i-PCI protocol describes a hardware, software, and firmware architecture that collectively enables virtualization of host memory-mapped I/O systems. For a PCI-based host, this involves extending the PCI I/O system architecture based on PCI Express.

The i-PCI protocol extends the PCI I/O System via encapsulation of PCI Express packets within network routing and transport layers and Ethernet packets and then utilizes the network as a transport. The network is made transparent to the host and thus the remote I/O appears to the host system as an integral part of the local PCI system architecture. The result is a virtualization of the host PCI System. The i-PCI protocol allows certain hardware devices (in particular I/O devices) native to the host architecture (including bridges, I/O controllers, and I/O cards) to be located remotely. FIG. 1 shows a detailed functional block diagram of a typical host system connected to multiple remote I/O chassis. An i-PCI host bus adapter card [101] installed in a host PCI Express slot [102] interfaces the host to the network. An i-PCI remote bus adapter card [103] interfaces the remote PCI Express bus resources to the network.

There are three basic implementations of i-PCI:

1. i-PCI: This is the TCP/IP implementation, utilizing IP addressing and routers. This implementation is the least efficient and results in the lowest data throughput of the three options, but it maximizes flexibility in quantity and distribution of the I/O units. Refer to FIG. 2 for an i-PCI IP-based network implementation block diagram.

2. i(e)-PCI: This is the LAN implementation, utilizing MAC addresses and Ethernet switches. This implementation is more efficient than the i-PCI TCP/IP implementation, but is less efficient than i(dc)-PCI. It allows for a large number of locally connected I/O units. Refer to FIG. 3 for an i(e)-PCI MAC-Address switched LAN implementation block diagram.

3. i(dc)-PCI. Referring to FIG. 4, this is a direct physical connect implementation, utilizing Ethernet CAT-x cables. This implementation is the most efficient and highest data throughput option, but it is limited to a single remote I/O unit. The standard implementation utilizes 10 Gbps Ethernet (802.3an) for the link [401], however, there are two other lower performance variations. These are designated the "Low End" LE(dc) or low performance variations, typically suitable for embedded or cost sensitive installations:

The first low end variation is LE(dc) Triple link Aggregation 1 Gbps Ethernet (802.3ab) [402] for mapping to single-lane 2.5 Gbps PCI Express [403] at the remote I/O.

A second variation is LE(dc) Single link 1 Gbps Ethernet [404] for mapping single-lane 2.5 Gbps PCI Express [405] on a host to a legacy 32-bit/33 MHz PCI bus-based [406] remote I/O.

The i-PCI protocol describes packet formation via encapsulation of PCI Express Transaction Layer packets (TLP). The encapsulation is different depending on which of the implementations is in use. If IP is used as a transport (as illustrated in FIG. 2), the end encapsulation is within TCP, IP, and Ethernet headers and footers. If a switched LAN is used as a transport, the end encapsulation is within Ethernet data link and physical layer headers and footers. If a direct connect is implemented, the end encapsulation is within the Ethernet physical layer header and footer. FIG. 5 shows the high-level overall concept of the encapsulation technique, where TCP/IP is used as a transport.

SUMMARY OF THE INVENTION

The invention achieved technical advantages by virtualizating an Endpoint function via the Internet and LANs. One aspect of the invention is a solution that allows the use of low-complexity, low-cost PCI Express Endpoint Type 0 cores or custom logic for relatively simple virtualization applications. The invention combines two physically separate assemblies in such a way that they appear to the host system as one local multifunctional PCI Express Endpoint device. One assembly is located locally at the host computer and one assembly is located remotely. Separately, they each implement a subset of a full Endpoint design. Together they create the appearance to the host operating system, drivers, and applications as a complete and normal local multifunctional PCI Express device. In actuality the device transaction layer and application layer are not located locally, but rather, they are located remotely at some access point on a network. Together the local assembly and the remote assembly appear to the host system as though they are a single multifunction Endpoint local device. A difference, in comparison to switch virtualization, is that with Endpoint virtualization, there is no PCI/PCI bridge, the interconnection is not enumerated by the PCI system software and does not appear to the host system as a PCI bus.

The invention provides an implementation advantage, in virtualized extended systems applications, as it simplifies the hardware design at the remote end point. Through simplification of hardware design, remote devices may be constructed that use less power and are of smaller size than otherwise possible, of particular advantage in wireless applications.

BRIEF DESCRIPTION OF THE DRAWINGS

FIG. 9 shows the Type 1 Configuration Space associated with PCI bridges and PCI Express switches;

FIG. 10 shows the Type 0 Configuration Space associated with PCI Express Endpoint device functions;

DETAILED DESCRIPTION OF THE PRESENT INVENTION

Figure 6:
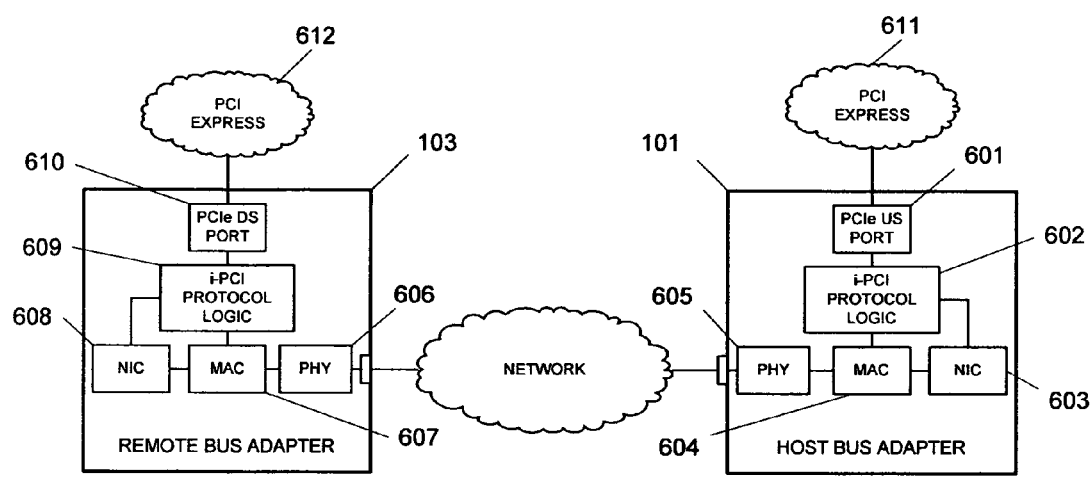
FIG. 6 is a block diagram showing the major functional blocks of the host bus adapter, remote bus adapter, and network interconnect for implementing the i-PCI protocol.

Referring to FIG. 6, there are two primary hardware assemblies provided to implement the i-PCI protocol: 1) Host Bus Adapter [101] 2) Remote Bus Adapter [103].

1. The Host Bus Adapter (HBA) [101] is a critical component. First and foremost, it provides the physical interface to the network. In addition, many of the necessary i-PCI functional details are implemented in the host bus adapter. The host bus adapter major functional blocks include an up-stream PCIe port [601] that interfaces to the host PCIe link [611], i-PCI controller logic [602] block, a Network Interface Controller (NIC) [603], Media Access Controller (MAC) [604] and PHY [605]. Within the i-PCI Protocol Logic [602] block, PCI Express packet encapsulation is accomplished. This block also performs address translation from the system memory map to a network address and then back to a memory-mapped address as a packet moves between host and remote I/O. The i-PCI Protocol Logic handles system timeouts that occur as a result of the additional introduced latency.

2. The Remote Bus Adapter (RBA) [103] is functionally similar to the host bus adapter [101]. The primary function of the remote bus adapter card is to provide remote I/O devices with a physical interface to the network. PCI Express packet encapsulation for the remote I/O is implemented in the i-PCI Protocol Logic [609] on the RBA. The RBA supports the host bus adapter in ensuring the host system remains unaware that remote I/O is not located locally. The remote bus adapter assists the host bus adapter with the host PCI system enumeration and configuration system startup process. The remote bus adapter performs address translation for the remote I/O, translating transactions moving back and forth between the host and the remote I/O via the network. Similar in design and construction to the host bus adapter, the remote bus adapter major functional blocks include a PCI Express down-stream port [610], i-PCI controller logic [609], a Network Interface Controller (NIC) [608], MAC [607] and PHY [606]. The RBA provides the necessary PCI Express signaling for the remote I/O PCI Express links [612] to the remote resources and devices. The remote resources and devices include any allowed End Point devices and function(s) per the PCI Express specification.

A wireless version is also an implementation option for i-PCI. In a physical realization, this amounts to a wireless version of the Host Bus Adapter (HBA) and Remote Bus Adapter (RBA). For the wireless version, a Baseband Processor (BBP), transceiver, Front End (FE), and antenna is substituted for the PHY.

Figure 7:
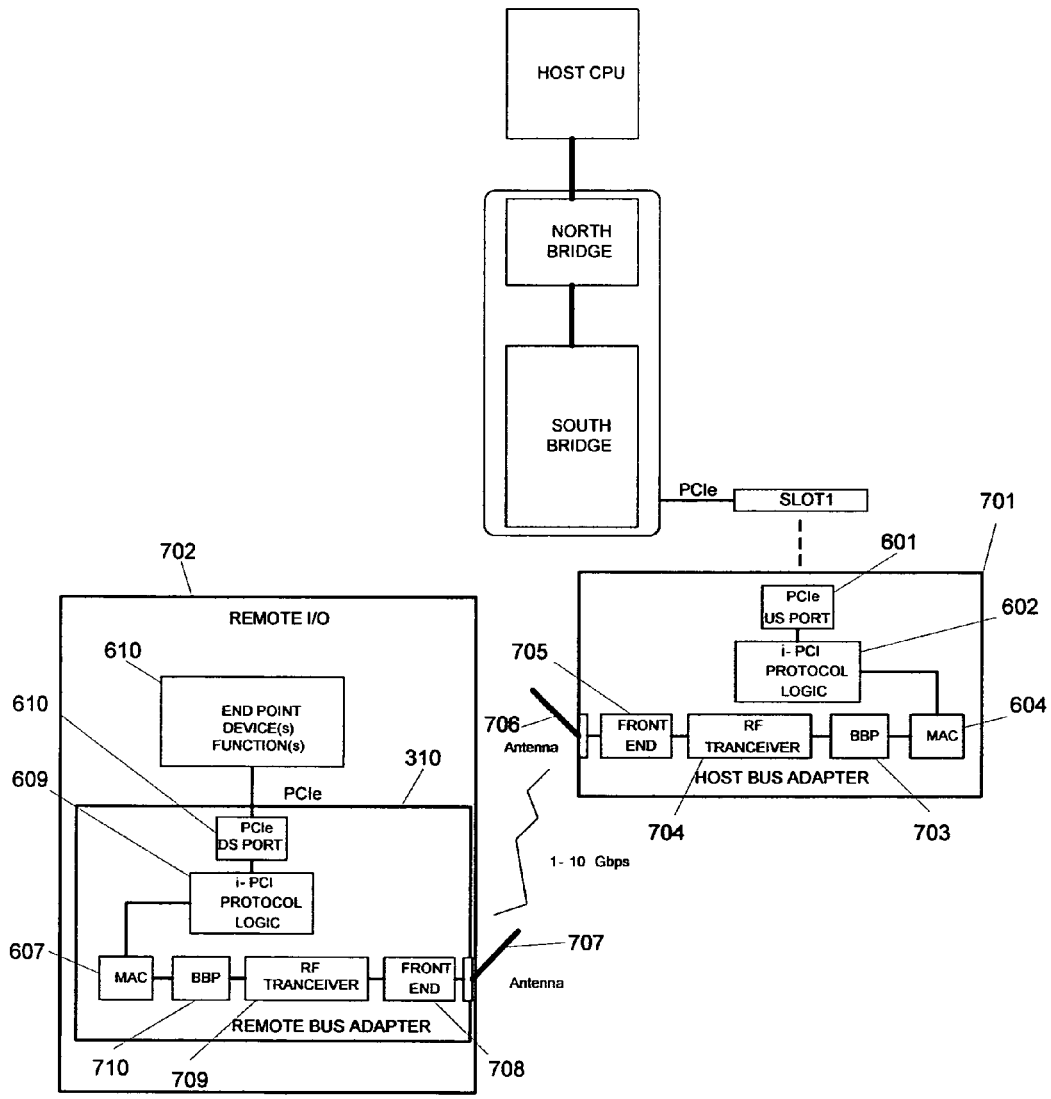
FIG. 7 is a functional block diagram of a wireless version of the host bus adapter and remote bus adapter implementing a WPAN data link.

Referring to FIG. 7, a wireless version of the host bus adapter may be realized, where a Baseband Processor (BBP) [701], RF transceiver [704], Front End [705], and antenna [706] is substituted for the HBA PHY [605] in FIG. 6.

Referring to FIG. 7, a wireless version of the remote bus adapter may be realized, where a Baseband Processor (BBP) [710], RF transceiver [709], Front End [708], and antenna [707] is substituted for the RBA PHY [606] in FIG. 6.

U.S. patent application Ser. No. 12/148,712, filed Apr. 21, 2008 describes the complete functionality of the HBA, RBA, and the i-PCI protocol logic, the teachings which are incorporated by reference.

Figure 8:
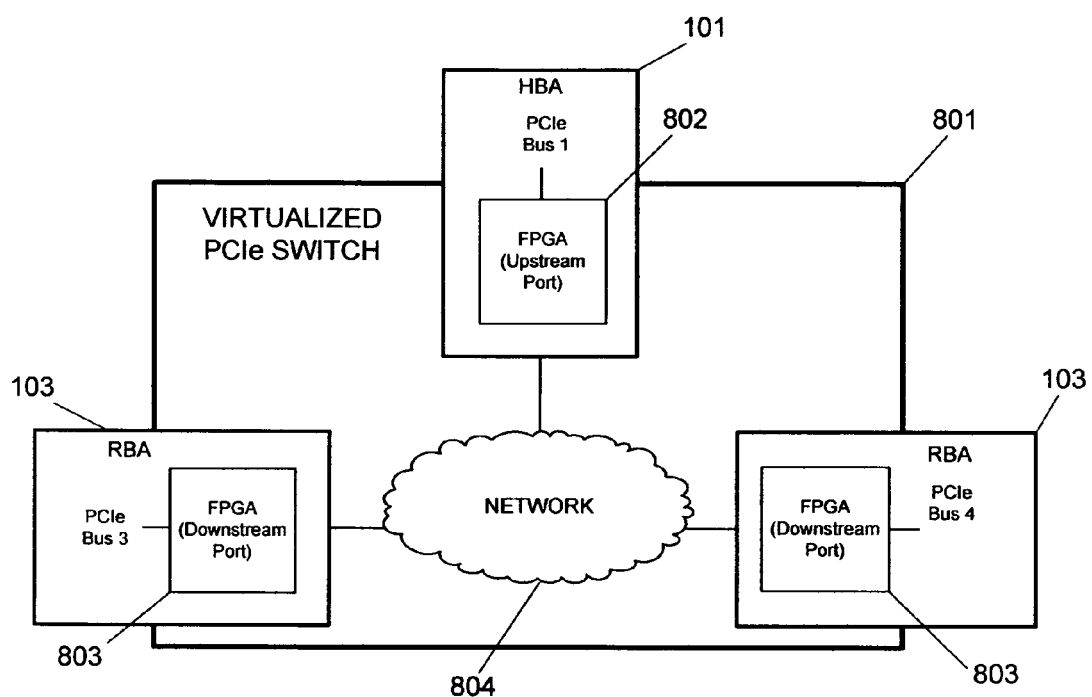
FIG. 8 is an illustration of a virtualized PCIe switch.

The concept of the virtualized switch or bridge was introduced in commonly assigned U.S. patent application Ser. No. 12/286,796, the teachings of which are incorporated herein by reference. Referring to FIG. 8, each bridge or port of a virtualized switch [801] can be located physically separate. PCIe bridges and ports may be implemented in separate programmable logic devices such as FPGAs. An HBA [101] installed in a host PCI Express slot may include an FPGA [802] onboard, implementing the upstream port. RBAs [103] located at up to 32 separate remote I/O chassis [104] may include an FPGA [803] onboard with each of them implementing a downstream port. These FPGAs can then be interconnected via a network [804]. The net result is a virtualized PCIe switch.

Figure 1:
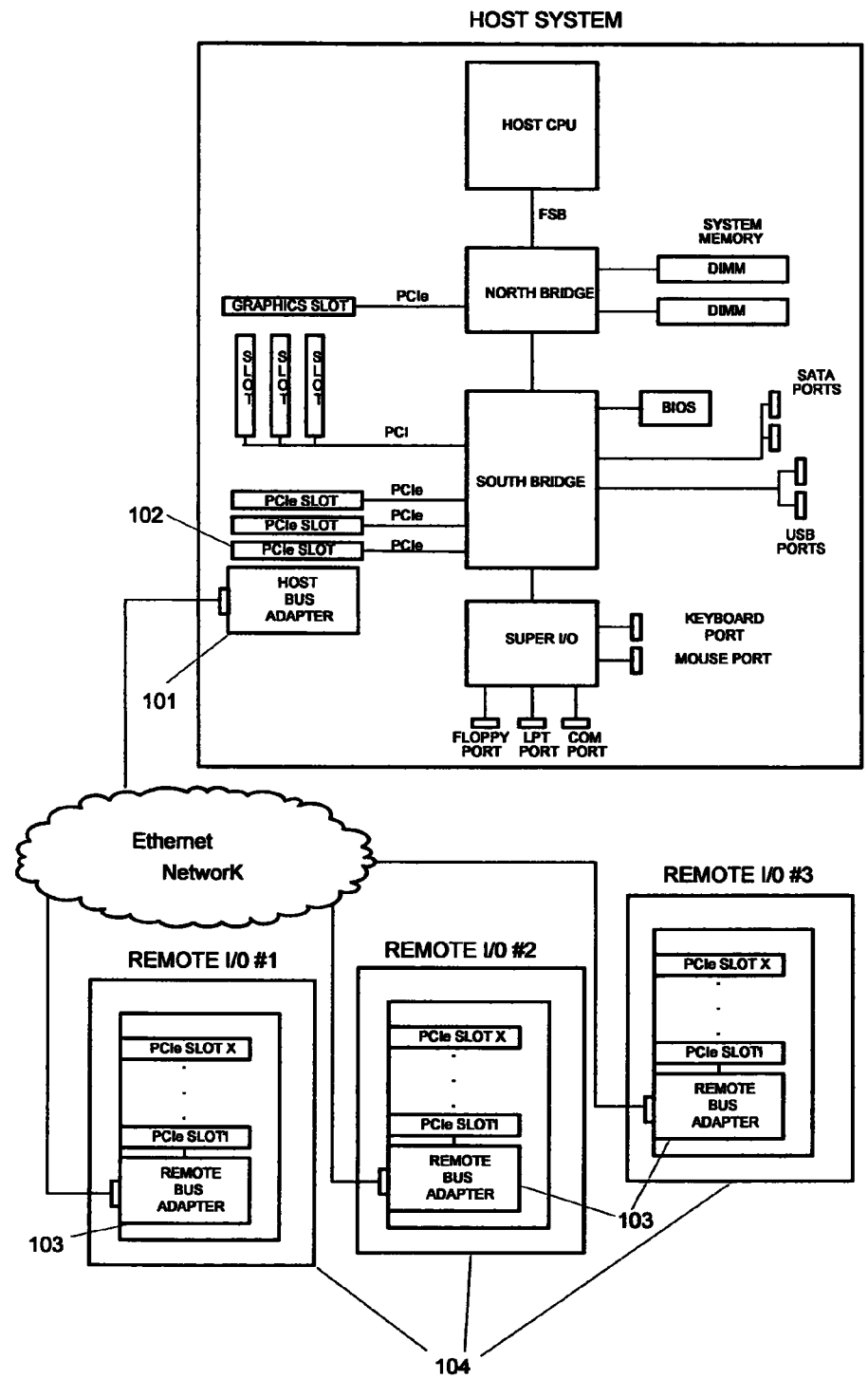
FIG. 1 shows a detailed functional block diagram of a typical host system connected to multiple remote I/O chassis implementing i-PCI.
Figure 2:
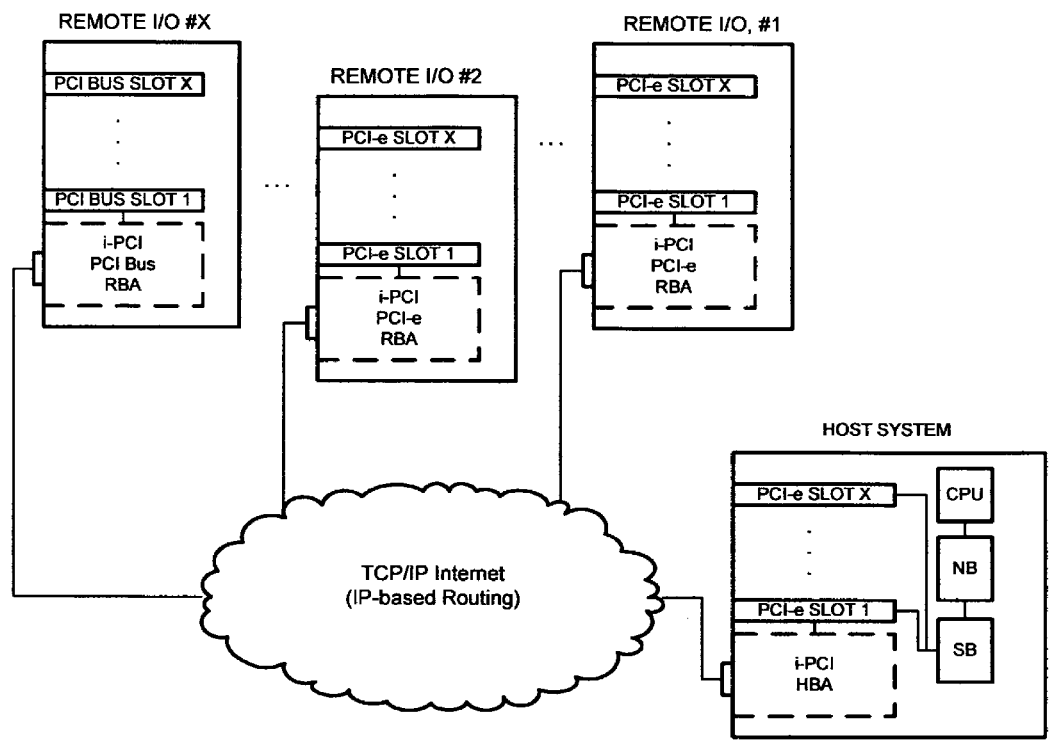
FIG. 2 is a block diagram of an i-PCI IP-based network implementation.
Figure 3:
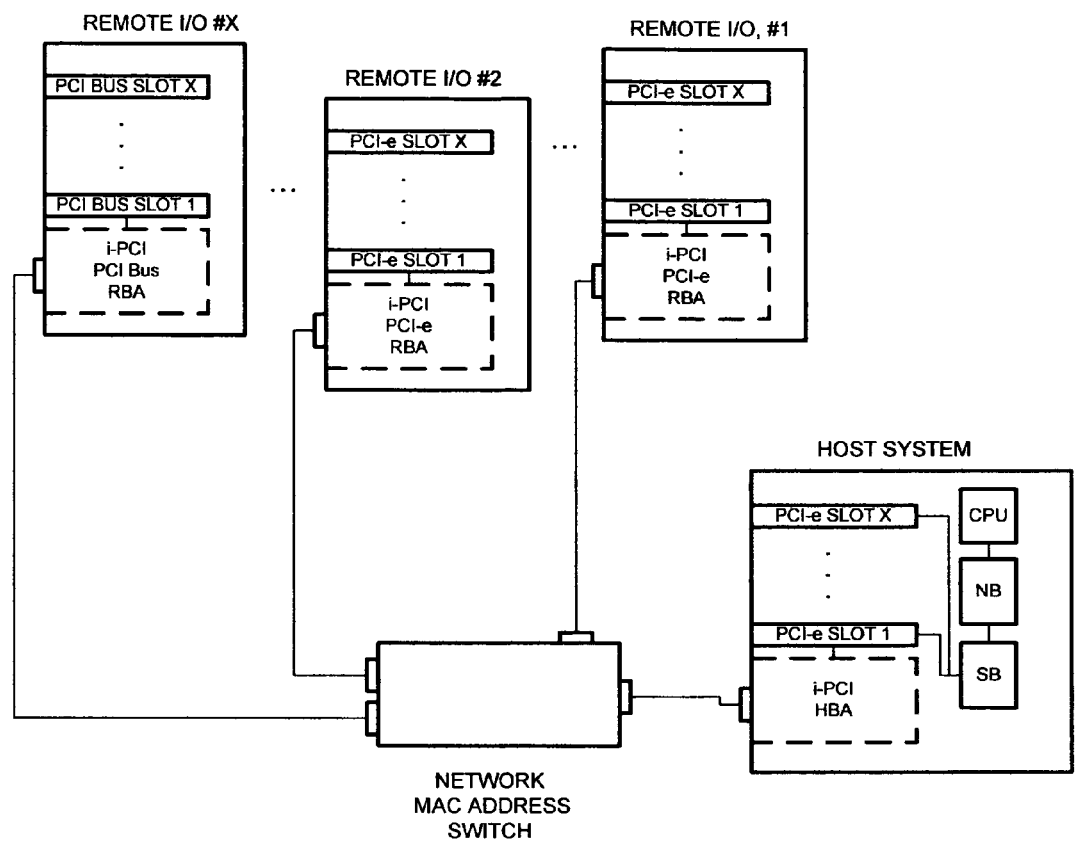
FIG. 3 is a block diagram of an, i(e)-PCI MAC-Address switched LAN implementation.
Figure 4:
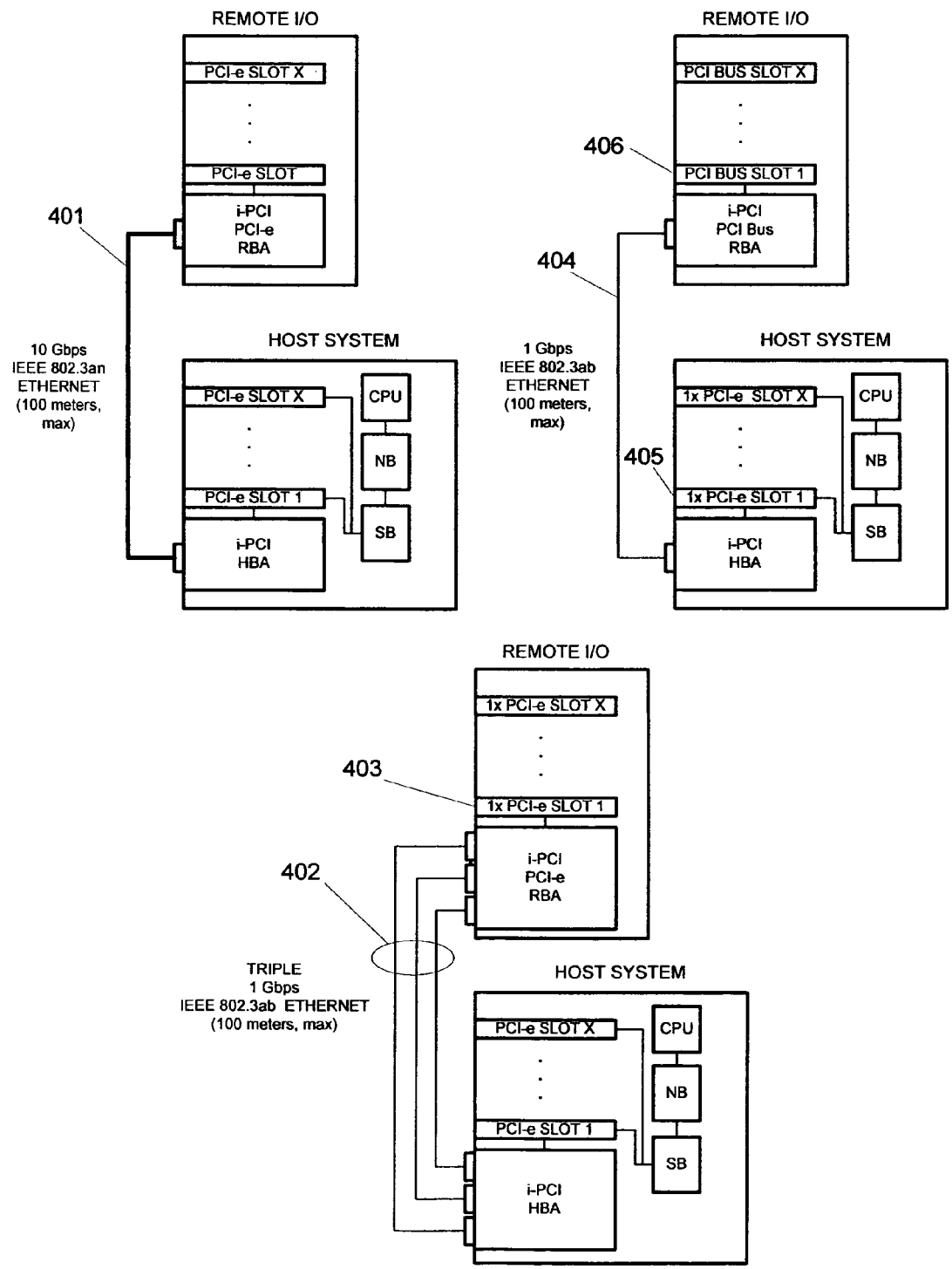
FIG. 4 is a block diagram of various direct physical connect i(dc)-PCI implementations, utilizing Ethernet CAT-x cables.
Figure 5:
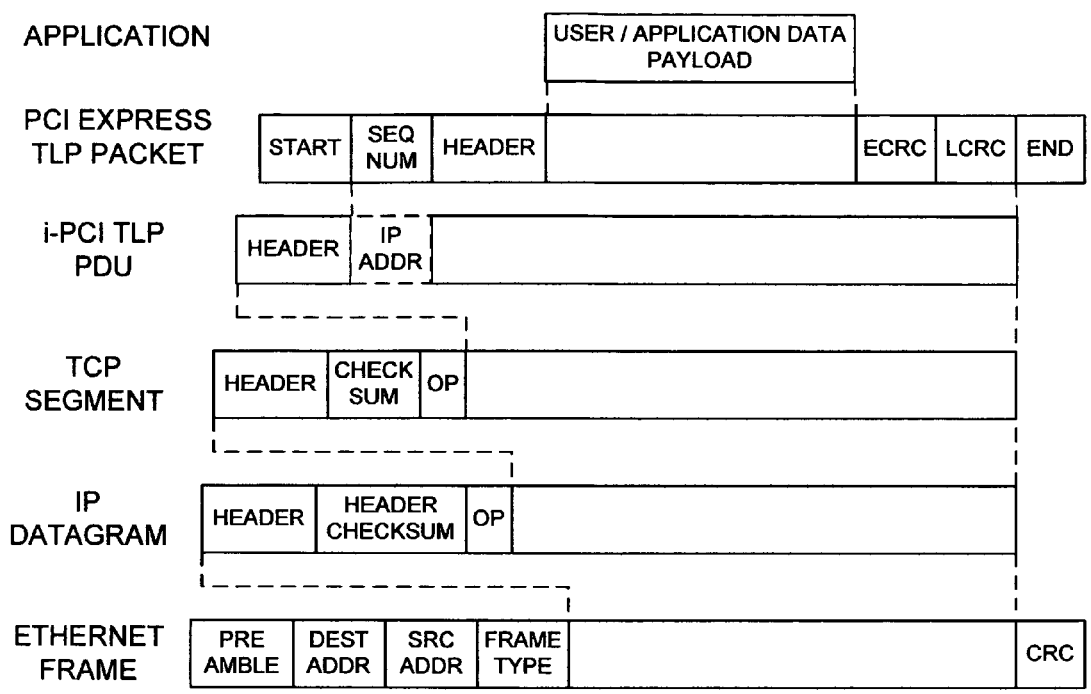
FIG. 5 is an illustrative diagram of i-PCI encapsulation showing TCP/IP used as transport.

The present invention pertains to a variation in the remote I/O architecture of an i-PCI system. The remote I/O [104] for i-PCI as shown in FIG. 1 includes PCI Express slots to accommodate adapter cards. Various adapter cards are inserted into PCI Express slots on the remote I/O backplane. The adapter cards typically consist of a collection of one or more PCI Express functions. The present invention provides virtualization of an Endpoint function via the Internet and LANs.

Commonly assigned U.S. patent application Ser. No. 12/286,796, the teachings of which are incorporated herein by reference, teaches and describes a virtualized switch [801]. A virtualized switch is similar but not the same as a virtualized Endpoint. A virtualized switch is quite versatile as it allows multiple devices to be located remotely, yet appear to the host system as local resources. However, a drawback with virtualizing switches is that it requires the use of FPGA and/or ASIC cores that are capable of handling Type 1 transactions associated with bridges and the associated Type 1 Configuration Space (as defined by the PCI Express Specification). Cores capable of handling Type 1 configuration transactions and Implementing Type 1 configuration space are typically more complex, more expensive, and less widely available than cores that implement the Type 0 Configuration Space associated with Endpoint device functions. See FIG. 9, Type 0 Configuration Space in comparison to the Type 1 Configuration Space shown in FIG. 10.

Virtualized switches are overkill in some applications requiring just a few (1-8) remote functions. It is highly desirable to have a simpler, less costly solution. The present invention is a solution that allows the use of low complexity, low cost PCI Express Endpoint Type 0 cores or custom logic for relatively simple virtualization applications (i.e. those involving the need to virtualize less than 8 PCI Express functions).

Per the PCI Express specification, a PCI Express Endpoint Device must have at least one function (Function0) but it may have up to eight separate internal functions. Thus, a single device at the end of a PCI Express link may implement up to 8 separate configuration spaces, each unique per function. Such PCI Express devices are referred to as "Multifunction Endpoint Devices".

Figure 11:
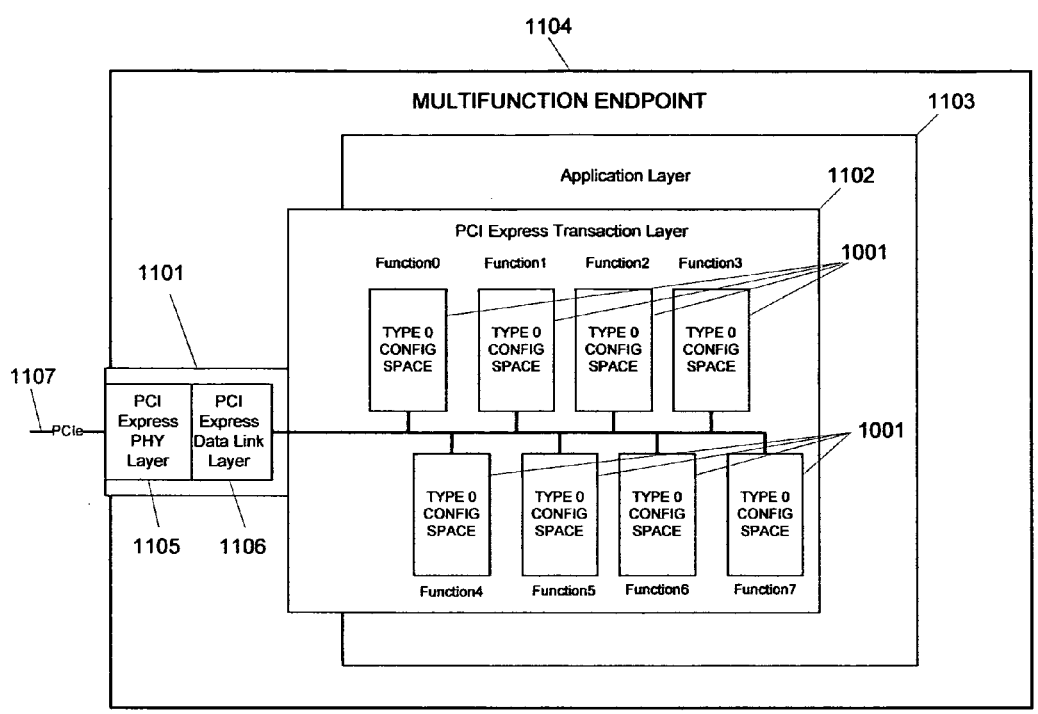
FIG. 11 is a block diagram of a multifunction Endpoint, showing the various layers.

Referring to FIG. 11, according to one aspect of the present invention, a multifunction Endpoint is shown connected to a host PCI Express Link [1107] via an Endpoint Port [1101] composed of a PHY [1105] and Data Link layer [1106]. The multifunction Endpoint Port [1101] is connected to the PCI Express Transaction Layer [1102] where each function is realized via separate configuration space [1101]. The PCI Express Transaction layer [1102] interfaces to the endpoint Application Layer [1103], with the interface as defined by the PCI Express specification. Up to eight separate software-addressable configuration accesses are possible as defined by the separate configuration spaces [1001]. Advantageously, the operating system accesses a combination of registers within each function's Type 0 configuration space [1001] to uniquely identify the function and load the corresponding driver for use by a host application. The driver then handles data transactions to/from the function and corresponding Endpoint application associated with the particular configuration space, per the PCI Express specification.

Figure 12:
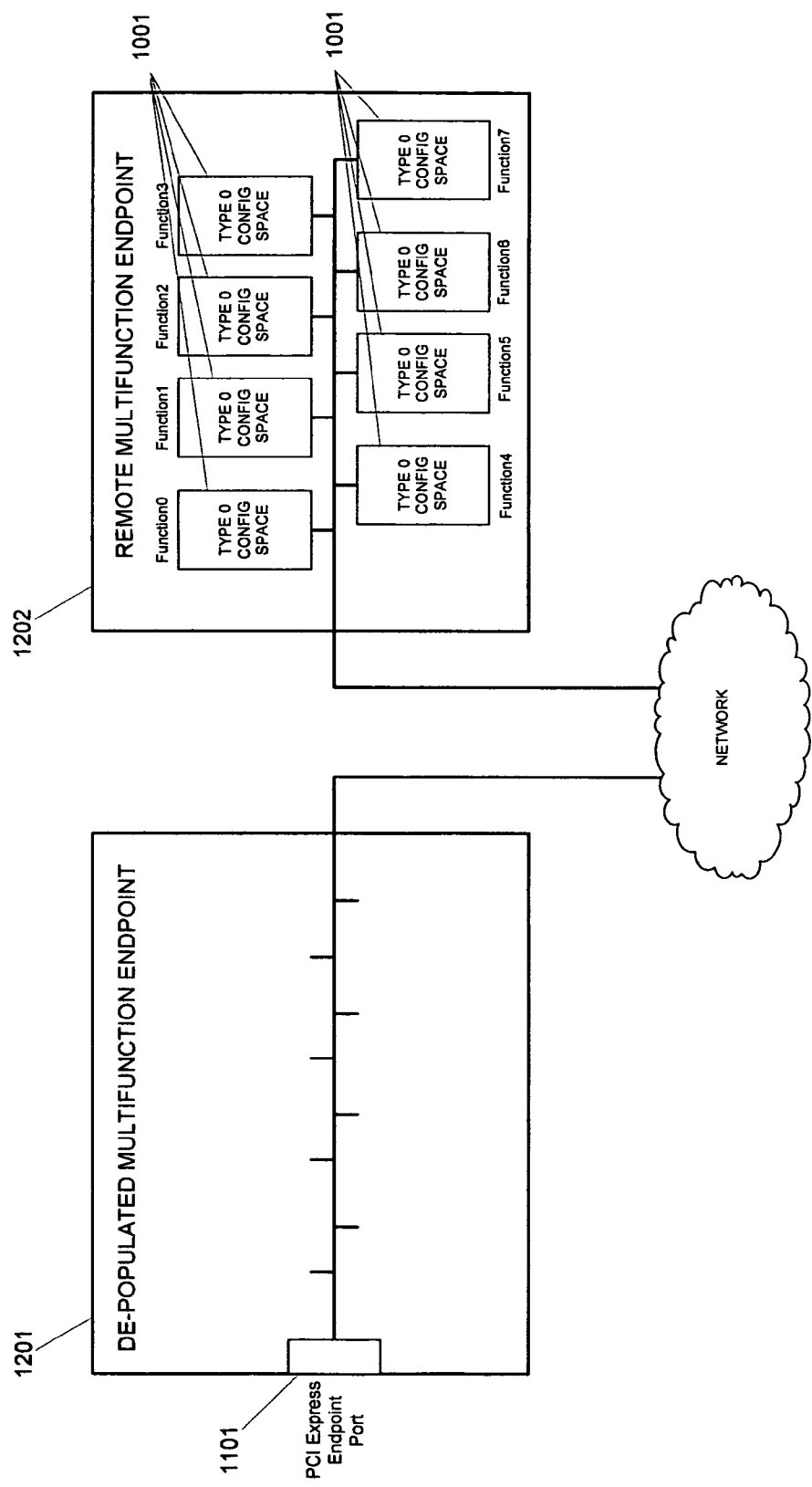
FIG. 12 is a basic illustration of combining two physically separate assemblies in such a way that they appear to the host system as one local multifunctional PCI Express Endpoint device.

One aspect of the invention combines two physically separate assemblies in such a way that they appear to the host system as one local multifunctional PCI Express Endpoint device. Referring to FIG. 12, one assembly [1201] is located locally at the host computer and one assembly is located remotely [1202]. Separately, they each implement a subset of a full Endpoint design. Together they create the appearance to the host operating system, drivers, and applications as a complete and normal local multifunctional PCI Express Endpoint device. In actuality, the device transaction layer [1102] and Endpoint application layer [1103]—including the configuration space [1001] for each function—are not located locally but rather they are located remotely at some access point on a network. One way to look at the invention is as a local multifunction Endpoint that is "de-populated" of functions, the functions virtualized, and re-located to the remote device. Together the local assembly and the remote assembly appear to the host system as though they are a single multifunction local device.

In one preferred embodiment, i-PCI as described in commonly assigned U.S. patent application Ser. No. 12/148,712 (the teachings of which are incorporated herein by reference) is used to encapsulate/un-encapsulate all transactions targeting a function (and the associated Endpoint application) and transport them to/from the remote assembly where the transaction layer and application layer are actually physically realized.

In one preferred embodiment, the local assembly [1201] is a specially designed depopulated or "dummy" adapter card that does not act on any transactions other than to present an PCI Express Endpoint port [1101] interface to the host system and accomplish data transport per the i-PCI specification. i-PCI encapsulates PCI Express transaction layer packets ingressing/egressing via the PCI Express Endpoint port within network routing and transport layers and Ethernet packets and then utilizes the network as a transport. If IP is used as a transport, the end encapsulation is within TCP, IP, and Ethernet headers and footers. If a switched LAN is used as a transport, the end encapsulation is within Ethernet data link and physical layer headers and footers. If a direct connect is implemented, the end encapsulation is within the Ethernet physical layer header and footer. A wireless network link, as previously described, may also be implemented. The network link is transparent to the host and thus the remote Endpoint functions and applications appear to the host system as if they are local and part of a normal PCI Express Endpoint. A difference in comparison to switch virtualization is that with Endpoint virtualization, there is no PCI/PCI bridge, the interconnection is not enumerated by the PCI system software and does not appear to the host system as a PCI bus.

Figure 13:
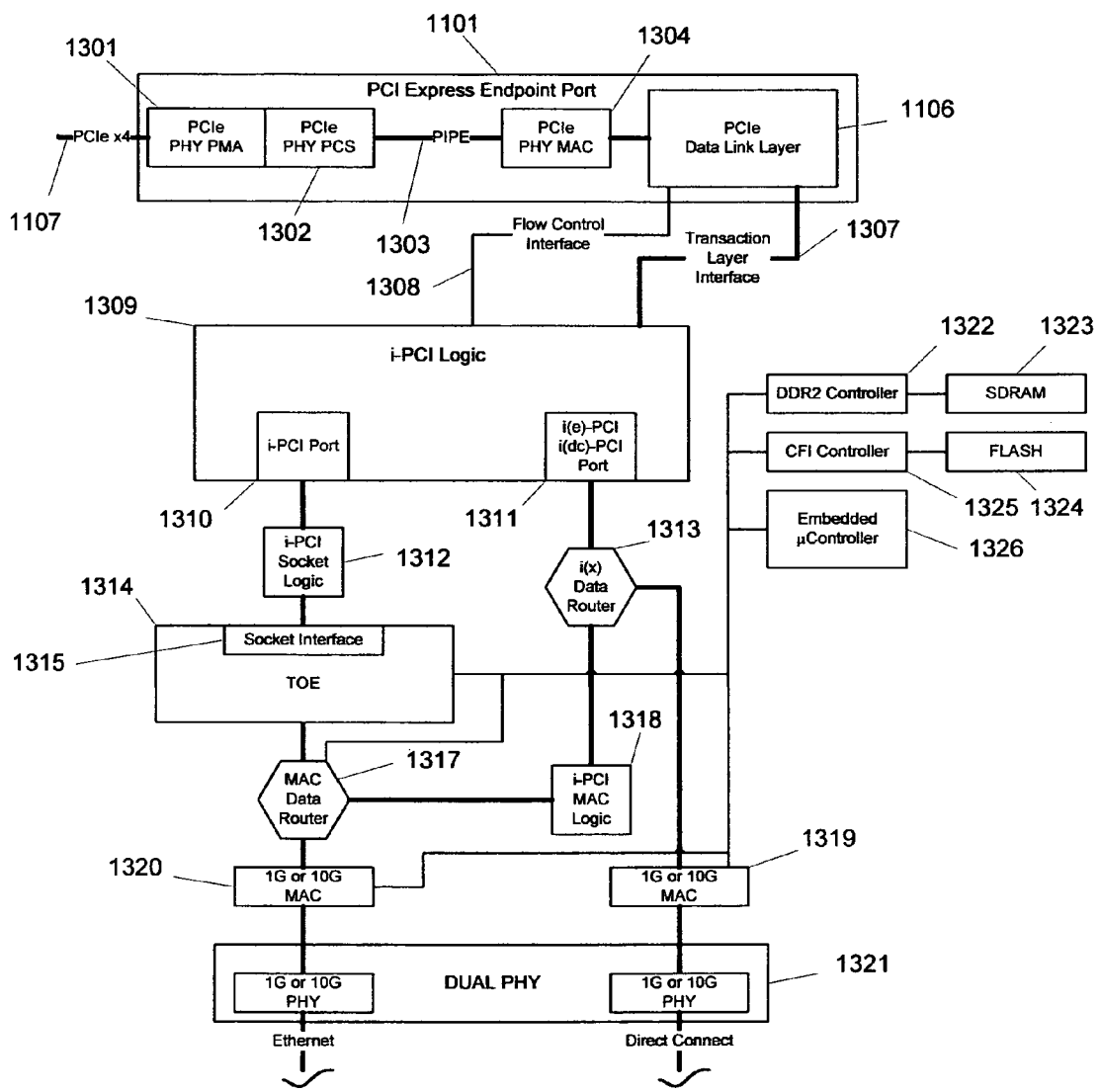
FIG. 13 is an illustration of the local adapter architecture that enables the virtualization of Endpoint functions.

An illustration of the local adapter architecture that enables the virtualization of Endpoint functions is shown in FIG. 13. The PCI Express Endpoint port [1101] interfaces to the host PCI Express upstream link [1107] via the PCIe PHY Physical Media Attachment Layer (PMA) [1301]. The PHY PMA contains the analog buffers and SERDES. The PHY PMA interfaces to the PHY Physical Coding Sub-layer (PCS) [1302] which notably contains the 8b/10b coding functionality. Together the PMA and PCS form the PHY transceiver commonly provided as an I/O block in higher end FPGAs. A PHY Interface for the PCI Express Architecture (PIPE) [1303] connects the PCS to the PCIe PHY MAC [1304]. The PCIe PHY MAC contains the state machines for link training and lane-lane deskew amongst other capability. The PCIe PHY MAC [1304] interfaces to the PCIe Data Link Layer logic [1106]. The PCI Express Data Link layer logic [1106] contains multiple functions including but not limited to PCIe link control, replay buffer, and link management all in compliance with the PCI Express specification requirements. In a standard Endpoint design, the Data Link Layer would interface directly to the Transaction Layer as was shown in FIG. 11. However, in the case of the invention, the Data Link Layer [1106] interfaces to the i-PCI Logic [1309]. The i-PCI logic and a network link intercede and the Transaction and Application Layers are relocated to a remote assembly. There is a Flow Control Interface [1308] which allows the i-PCI logic [1309] access to Data Link Layer Packets (DLLPs) and the replay buffer to manage the flow control, as described in commonly assigned U.S. patent application Ser. No. 12/148,712. The main packet interface between the Data Link Layer Logic [1106] and the i-PCI Logic [1309] is the Transaction Layer Interface [1307]. Transaction Layer packets ingress/egress via this interface.

The i-PCI Logic [1309] accomplishes the system I/O resource virtualization, per details as described in commonly assigned U.S. patent application Ser. No. 12/148,712, the teachings of which are incorporated herein by reference. The i-PCI logic performs encapsulation/un-encapsulation, and utilizes latency and timeout mitigation to uniquely enable effective I/O resource virtualization. The i-PCI Logic interfaces the PCIe Endpoint Port [1101] to/from the TCP/IP Offload Engine (TOE) [1314] via the i-PCI port [1310], i-PCI Socket Logic [1312] and Socket Interface [1315]. The TOE [1314] works with the i-PCI Logic [1309] to maximize data throughput speeds for the i-PCI protocol. Alternatively, i(e)-PCI or i(dc)-PCI transactions are routed around the TOE via the i(e)-PCI i(dc)-PCI port [1311] and the i(x) Data Router [1313]. If the i-PCI protocol is the i(dc)-PCI variant, the transaction routes to/from a separate Media Access Controller (MAC) [1319]. If the i-PCI protocol is the i(e)-PCI variant, the transactions are routed by the i(x) Data Router [1313] to the common MAC via the i-PCI MAC Logic [1318] and the MAC data Router [1317]. In all cases, the transactions are translated to/from the physical layer signaling by the Dual PHY [1321].

Supporting management blocks include an embedded microcontroller [1326] for configuration and status capabilities, a CFI controller [1325] for interfacing to non-volatile flash memory [1324] and a DDR2 SDRAM memory controller [1322] for interfacing to SDRAM [1323] utilized by the embedded microcontroller.

Figure 14:
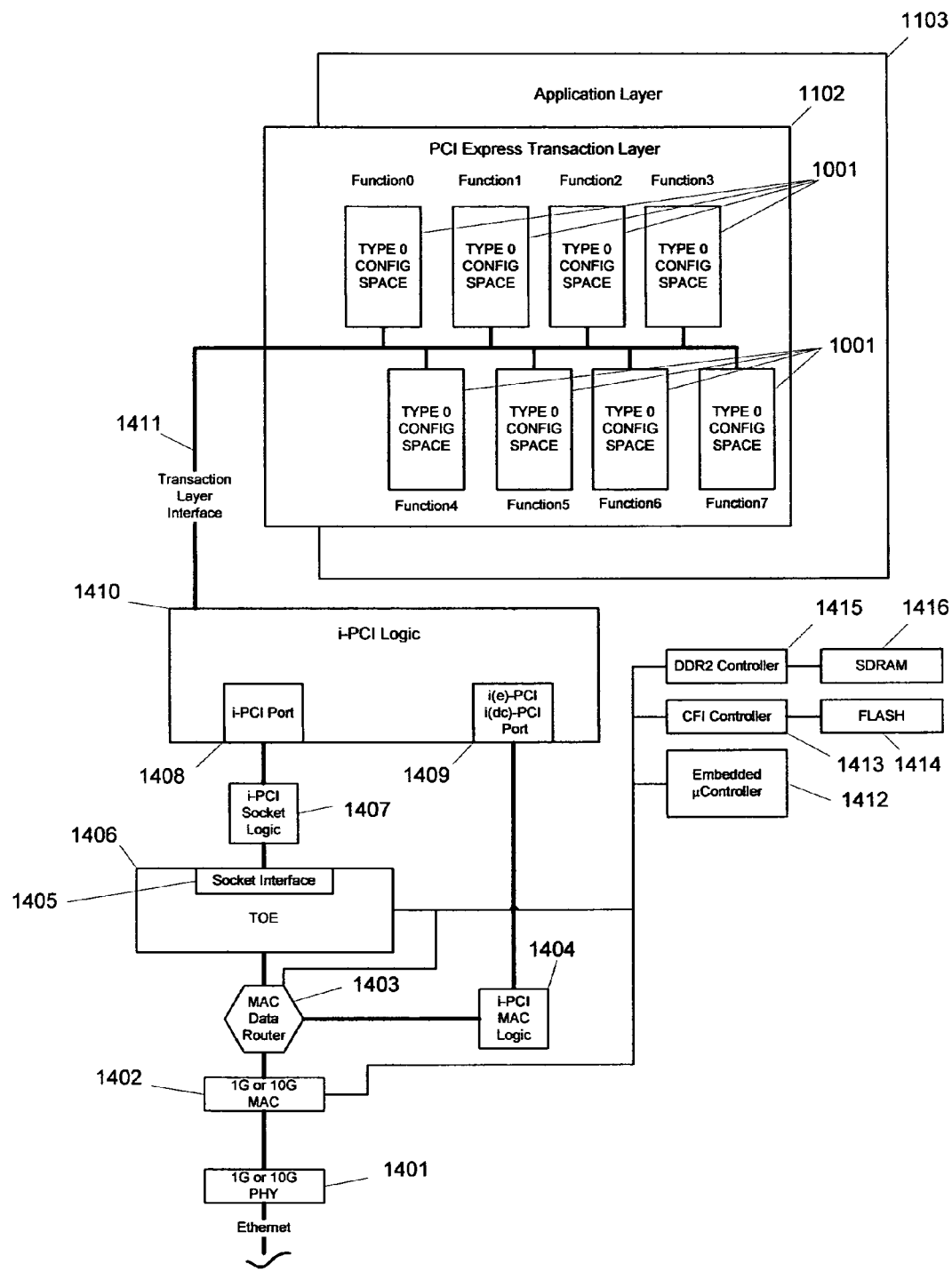
FIG. 14 is an illustration of the remote adapter architecture that implements the virtualized Endpoint functions.

An illustration of the remote assembly architecture that implements the virtualized Endpoint functions [1001] is shown in FIG. 14. It may be seen that the Transaction Layer [1102] and Application layer [1103] associated with the Endpoint has been re-located to the remote assembly. Connection back to the Endpoint port [1101], including the Data Link Layer [1106] is via the network more specifically network frames containing i-PCI encapsulated PCIe packets. The frames ingress/egress the physical layer signaling via the network PHY [1401].

Similarly to the i-PCI logic [1309] on the local assembly shown in FIG. 13, the i-PCI Logic [1410] at the remote assembly performs encapsulation/un-encapsulation per the i-PCI protocol. The i-PCI Logic [1410] interfaces the relocated PCIe Endpoint Transaction Layer [1102] and Application Layer [1103] to/from the TCP/IP Offload Engine (TOE) [1406] via the i-PCI port [1408], i-PCI Socket Logic [1407] and Socket Interface [1405]. The TOE [1406] works with the i-PCI Logic [1410] to maximize data throughput speeds for the i-PCI protocol. Alternatively, i(e)-PCI or i(dc)-PCI transactions are routed around the TOE via the MAC Data Router [1403], the i-PCI MAC Logic [1404], and the i(e)-PCI i(dc)-PCI port [1409].

Supporting management blocks include an embedded microcontroller [1412] for configuration and status capabilities, a CFI controller for interfacing to non-volatile flash memory [1414] and a DDR2 SDRAM memory controller [1415] for interfacing to SDRAM [1416] utilized by the embedded microcontroller.

The invention provides an implementation advantage over virtualized switch solutions in extended systems applications, as it simplifies the hardware design at the remote end point. One may envision the remote assembly as a wireless device. The PCI Express bus is not recreated at the Endpoint, and in fact the PCIe PHY and PCIe Data Link Layers are also not recreated at the Endpoint. The result is a simplification of hardware design. Advantageously, the invention enables remote devices that use less power and are of smaller size and complexity than otherwise possible. Less power and smaller size are distinct advantages where the remote is wireless or otherwise space/power constrained.

In a variation of the basic concept, there may be more than a single remote assembly. The invention provides the possibility that each of the eight functions and associated applications may be located at eight physically separate remote locations, with each of the eight remote assemblies implementing a single function. The eight remote assemblies in combination with the local assembly form a complete multifunction device. Other combinations of remotes implementing anywhere from 1-8 functions are possible. Although the invention has been described with respect to specific preferred embodiments, many variations and modifications will become apparent to those skilled in the art upon reading the present application. It is therefore the intention that the claims be interpreted as broadly as possible in view of the prior art to include such variations and modifications.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A system configured to virtualize a local bus function via the Internet and LANs.

2. The system as specified in claim 1 wherein the local bus is PCI or PCI Express.

3. The system as specified in claim 2 wherein the system is configured to encapsulate/un-encapsulate data packets of PCI or PCI Express.

4. The system as specified in claim 3 wherein there is no PCI/PCI bridge provided to virtualize the local bus.

5. The system as specified in claim 1 where there is no PCI/PCI bridge provided to virtualize the local bus.

6. The system as specified in claim 1 wherein the local bus function is a PCI Endpoint function.

7. The system as specified in claim 1 wherein the system comprises:
   a local assembly configured to adapt the local bus to a network and implement a subset of PCI Endpoint functionality;
   a virtualization protocol and transport configured to transport packets from the local assembly via the network;
   at least one remote assembly configured to receive the packets and adapt the network to a subset of PCI Endpoint functionality;
   wherein the local assembly and the at least one remote assembly together form a complete PCI Endpoint functionality.

8. The system as specified in claim 7 wherein the transport is defined by an Internet Protocol Suite.

9. The system as specified in claim 8, wherein the transport is TCP/IP.

10. The system as specified in claim 7, where the transport is a LAN.

11. The system as specified in claim 10, wherein the LAN is an Ethernet.

12. The system as specified in claim 7, wherein the transport is a direct connect arrangement configured to utilize an Ethernet physical layer as the transport, without consideration of a MAC hardware address or any interceding external Ethernet switch.

13. The system as specified in claim 7, wherein the transport is a wireless transport and the local assembly and the at least one remote assembly include a radio platform.

14. The system as specified in claim 7 wherein the virtualization protocol is i-PCI.

15. The system as specified in claim 7 wherein the local assembly and remote assembly are configured to appear to the host system as one local multifunctional PCI Express Endpoint device.

16. The system as specified in claim 7 further comprising a plurality of remote assemblies each having an associated application, the associated applications configured to implement a single function.

17. The system as specified in claim 7 wherein a transaction layer and application layer associated with the Endpoint is located at the remote assembly.

18. The system as specified in claim 7 wherein the local assembly is an adapter card that is configured to not act on any transactions other than to present an PCI Express Endpoint port interface to a host system and accomplish data transport per the i-PCI specification.

19. The system as specified in claim 1 wherein the system comprises a PCI Express Endpoint Type 0 core.

20. The system as specified in claim 1 wherein the system is switchless.

* * * * *